No. 655,256.  
J. G. MacPHERSON.  
FIFTH WHEEL FOR VEHICLES  
(Application filed Nov. 22, 1899.)  
Patented Aug. 7, 1900.

(No Model.)

Witnesses:

John G. MacPherson
Inventor
By David P. Moore
Atty.

UNITED STATES PATENT OFFICE.

JOHN G. MacPHERSON, OF PHILADELPHIA, PENNSYLVANIA, ASSIGNOR TO THE MacPHERSON AUTOMOBILE COMPANY, OF NEW JERSEY.

FIFTH-WHEEL FOR VEHICLES.

SPECIFICATION forming part of Letters Patent No. 655,256, dated August 7, 1900.

Application filed November 22, 1899. Serial No. 737,863. (No model.)

*To all whom it may concern:*

Be it known that I, JOHN G. MACPHERSON, a citizen of the United States, residing at Philadelphia, in the county of Philadelphia and State of Pennsylvania, have invented certain new and useful Improvements in Fifth-Wheels for Vehicles, of which the following is a specification.

My invention relates to improvements in a fifth-wheel for vehicles and has special reference to an improved wheel with a steering-gear a part thereof.

The main object of my invention is the provision of a steering-geared fifth-wheel which is operated by a person sitting in the vehicle and which is very positive and sensitive in its operation.

Another object of my invention is to provide a means whereby the portion of the steering part of the wheel is always kept in contact with the operating mechanism, thereby avoiding all play and breakage from the wabbling or jerking common to fifth-wheels.

Another object of my invention is to provide a fifth-wheel and steering-gear therefor which is the embodiment of simplicity, durability, and cheapness, thus producing a very useful device.

To attain the desired objects, the invention consists of a steering-geared fifth-wheel embodying novel features of construction and combination of parts, substantially as disclosed herein.

Figure 1:
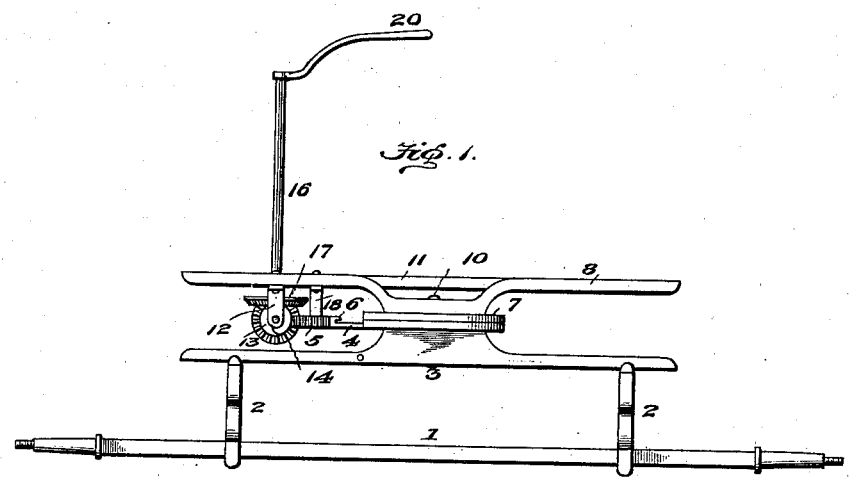
Figure 2:
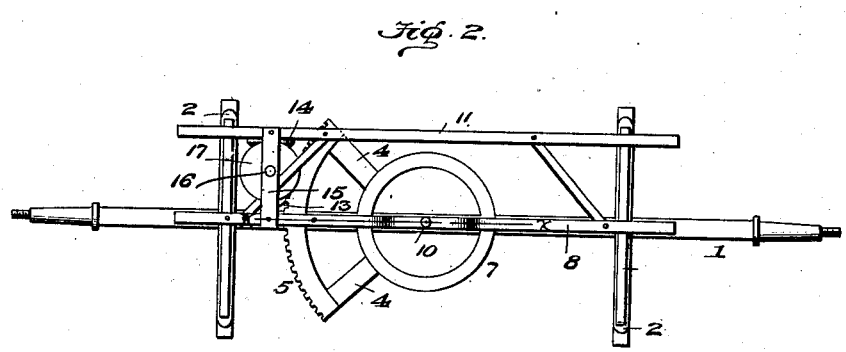
Figure 3:
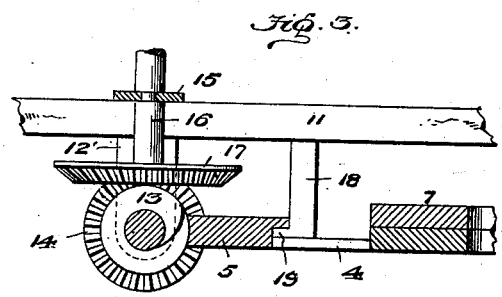

In the drawings, Figure 1 is a front elevation of an axle and its connections with my improved fifth-wheel and steering-gear attached thereto. Fig. 2 is a top plan view thereof with the handle for operating the steering-gear removed, and Fig. 3 is a sectional view taken on the line $x \, x$ of Fig. 2.

Referring to the drawings, the numeral 1 designates the front axle of a coupé having its usual springs 2, which has secured thereon the lower portion or platform 3 of the fifth-wheel. Projecting from the sides of this platform are the arms 4, to which is connected the segmental worm-gearing 5, and upon the inner side of this gearing is formed the projecting edge or flange 6, the purpose of which will appear later. Passing upward through the center of the platform and through the upper portion 7 of the fifth-wheel and through the brace-rod or stay 8 is the usual boling-pin 10, which holds the parts together.

To the rear of the stay is an auxiliary stay or support 11. Secured to and depending from the under side of the stays, upon the same side as the worm-gearing projects, are the bearings or journals 12 and 12' for the worm-screw 13, carrying the small beveled gear 14 near one end thereof. Journaled in the bearing 15 is the lower end of the vertical rod 16, carrying a large beveled gear 17, which meshes with the small beveled gear to operate the steering-gear.

To guard against the worm-gearing being disengaged from the worm-screw, I employ the keeper or lug 18, secured upon the under side of the front stay and provided with the lip or projection 19 to fit beneath the flange of the worm-gear opposite the worm-screw.

From the foregoing it will be seen that the slightest turn of the crank 20 will cause the fifth-wheel to be moved in any desired direction and that I provide a very simple, durable, and inexpensive steering-geared fifth-wheel.

I claim—

1. In combination with a vehicle, of a fifth-wheel consisting of an upper section, a lower section, a segmental worm-gearing having a flange upon its inner side and connected to the lower section, a worm-screw engaging said worm-gearing, means for engaging said flange of the segmental gearing to hold the screw and gearing together, and means for operating said screw to turn the fifth-wheel.

2. In combination with a vehicle, of a steering-geared fifth-wheel, consisting of a lower platform or section mounted upon the axle, a segmental worm-gearing connected to said platform and provided with a flange upon its inner side, an upper section of the wheel for resting upon the platform, a worm-screw for engaging and operating upon the segmental gearing, a lug or keeper for engaging the flange of said gearing to hold the part next to the worm-screw into close engagement, and a handle connected with said worm-screw to operate the steering-gear and turn the fifth-wheel.

In testimony whereof I affix my signature in presence of two witnesses.

JOHN G. MACPHERSON.

Witnesses:
CHAS. E. RIORDON,
DAVID P. MOORE.